United States Patent [19]
Ikeda et al.

[11] Patent Number: 5,114,208
[45] Date of Patent: May 19, 1992

[54] SLIDING MECHANISM FOR SUNROOF

[75] Inventors: Nobuyuki Ikeda, Ikeda; Kazuhisa Nagata, Okazaki; Chikashi Oba, Toyohashi, all of Japan

[73] Assignee: Aisin Seiki Kabushiki Kaisha, Aichi, Japan

[21] Appl. No.: 558,332

[22] Filed: Jul. 27, 1990

[30] Foreign Application Priority Data

Aug. 4, 1989 [JP] Japan .................. 1-92318[U]
Aug. 4, 1989 [JP] Japan .................. 1-92319[U]

[51] Int. Cl.$^5$ ............................. B60J 7/047
[52] U.S. Cl. .................. 296/216; 296/220; 296/222; 296/223
[58] Field of Search ............ 296/216, 218, 220, 222, 296/223, 221

[56] References Cited

U.S. PATENT DOCUMENTS

| | | | |
|---|---|---|---|
| 4,245,864 | 1/1981 | Shitanoki | 296/222 |
| 4,351,561 | 9/1982 | Tuchiya et al. | 296/216 |
| 4,602,815 | 7/1986 | Boots et al. | 296/222 |
| 4,652,045 | 3/1987 | Hanley et al. | 296/221 |

FOREIGN PATENT DOCUMENTS

| | | | |
|---|---|---|---|
| 3802379 | 8/1988 | Fed. Rep. of Germany | 296/218 |
| 63-242720 | 10/1988 | Japan . | |
| 0060420 | 3/1989 | Japan | 296/220 |

*Primary Examiner*—Dennis H. Pedder
*Attorney, Agent, or Firm*—Finnegan, Henderson, Farabow, Garrett & Dunner

[57] ABSTRACT

A sliding mechanism for the sunroof of an automotive vehicle includes a support arm having an upper portion attached to the sunroof, a roof rail having a main portion extending horizontally and a front end portion curved downwardly, a guide member guided and supported by the roof rail and provided on the lower portion of the support arm, a link whose one end is connected to the guide member, and a drive cable for moving the other end of the link linearly back and forth.

3 Claims, 11 Drawing Sheets

SLIDING MECHANISM FOR SUNROOF

BACKGROUND OF THE INVENTION

This invention relates to a sliding mechanism for a sunroof of an automotive vehicle.

By way of example, the specification of Japanese Patent Application Laid-Open (KOKAI) No. 63-242720 discloses an automotive vehicle having a roof provided with an opening capable of being opened and closed by sliding a sunroof.

Figure 14:
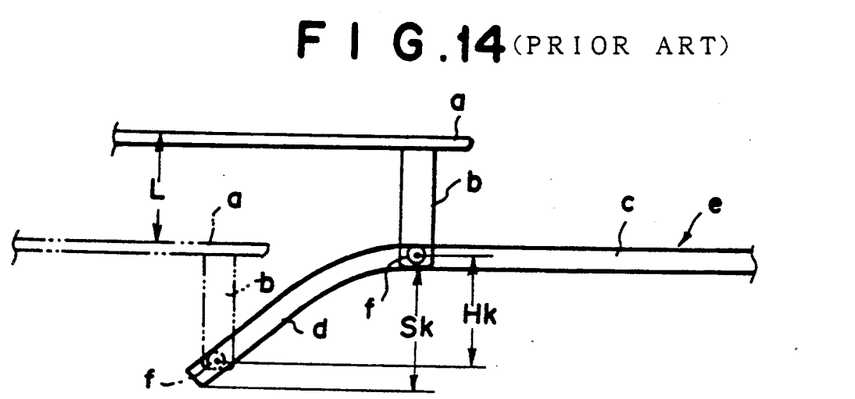
FIG. 14 is a view for describing the operation of a fixed arm-type mechanism according to a first example of the prior art.
Figure 17:
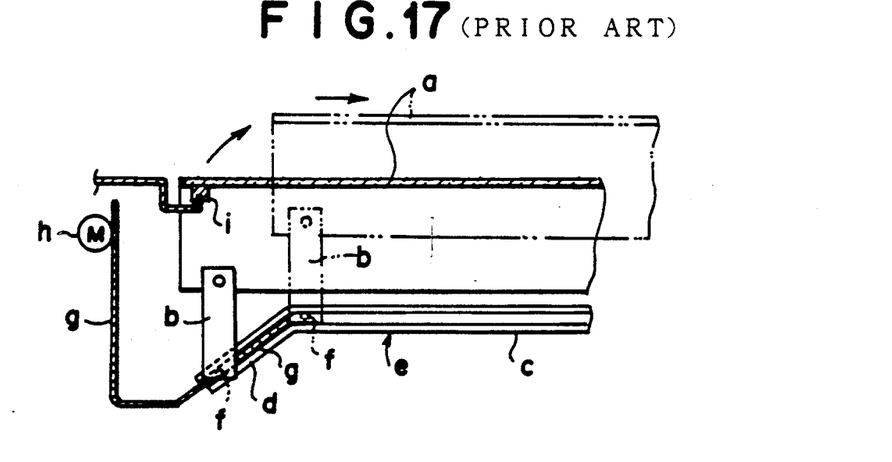
FIG. 17 is a side view showing the principal portion of an example of the prior art.

As shown in FIGS. 14 and 17, the slide structure of the sunroof described in the abovementioned patent publication includes a support frame b having an upper end portion attached to a sunroof a, a roof rail e having a having a main portion c which is linear and a downwardly curving front end portion d, a guide member f guided and supported by the roof rail e and provided on the lower end portion of the support arm b, and a drive cable g for moving the guide member f back and forth along the guide rail e. The drive cable g is disposed in the channel along the roof rail e. By causing the drive cable g to move the support arm b along the roof rail e, the sunroof a is not only slid back and forth but is also closed or lifted up by the front end portion d of the roof rail e. In FIGS. 14 and 17, the character h represents a driving source for the drive cable g, and i represents weather stripping attached to the edge of the opening in the roof.

In the foregoing construction, however, the part of the drive cable g corresponding to the front end portion d of the roof rail is flexed. As a result, the resistance applied to the drive cable g is large and a driving force cannot be transmitted to the sunroof a sufficiently. This makes it difficult for the sunroof a to be closed and lifted up smoothly.

Figure 18:
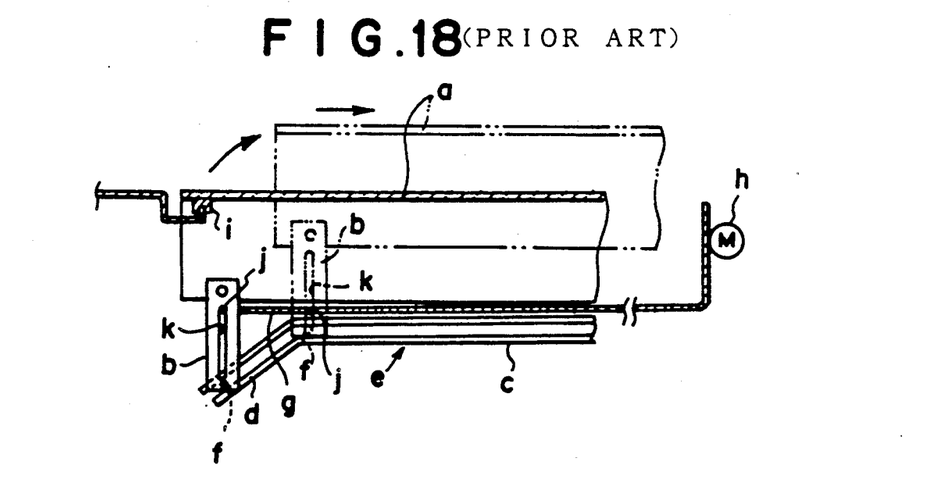
FIG. 18 is a side view showing the principal portion of another example of the prior art.

A known expedient for reducing the resistance of the drive cable is exemplified in FIG. 18. Here a pin j is provided in the tip of the drive cable g so as to project to the side, and the support arm b is provided with a slot k through which the pin j is passed so as to be capable of moving up and down therein. As a result, the support arm b can be moved up and down without flexing the drive cable g.

However, this conventional expedient results in a large frictional resistance between the pin j and the slot k, and therefore it is still difficult to close and lift the sunroof with sufficient smoothness.

In particular, when the sunroof a is brought into pressured contact with the weather stripping i at closing of the opening, the direction of a force applied to the support arm b from the drive cable g and the direction of a force by which the roof rail e attempts to pull down the support arm b are perpendicular to each other, and therefore the frictional force between the slot k and the pin j becomes very large. This makes it difficult to close off the opening with certainty.

Figure 15:
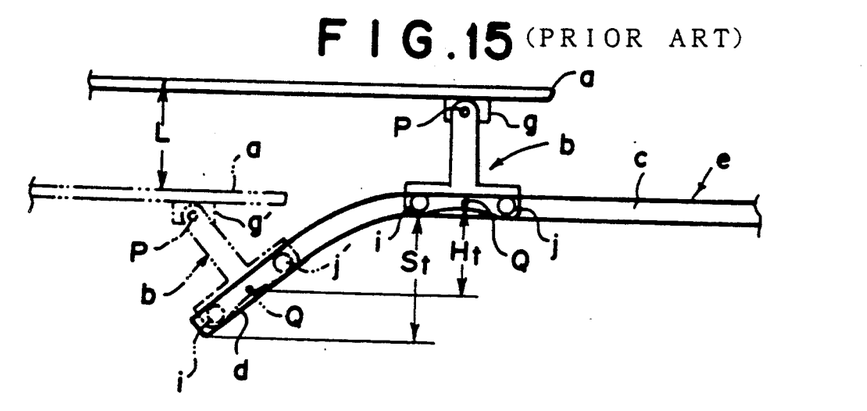
FIG. 15 is a view for describing the operation of an inverted T-shaped arm-type mechanism according to a second example of the prior art.

A second example of the prior art shown in FIG. 15 is of the type using an inverted T-shaped arm. Specifically, a bracket g' is attached to the sunroof a, the upper end of the support arm b, which has an inverted T-shaped configuration, is pivotally supported on the bracket g', and the guide member i and a rear guide member j', which are movable within the roof rail e, are provided on lower edge of the support arm b. In accordance with this example of the prior art, an amount of lift L can be obtained, which depends upon an amount of arm movement Ht, namely the amount of up-and-down movement of the center Q (the center point between the two guide members i, j') of the lower edge of the support arm b, and an amount of up-and-down displacement of a pivot point P (the point at which the support arm b is pivotally supported on the bracket g') obtained by turning the support arm b up and down about the center point Q.

In the first example of the prior art shown in FIG. 14, however, the amount of lift L of the sunroof a is nothing more than an amount of up-and-down arm movement Hk. Consequently, if the amount of lift L is large, an amount Sk by which the front end d of the roof rail declines also is large. The result is a lower ceiling for the passenger compartment and therefore a passenger compartment with less interior space.

In the second example of the prior art, as shown in FIG. 15, the line segment connecting the pivot point P on the bracket g' and the center point Q becomes vertical when the support arm b is situated on the main portion c of the sun rail e. Consequently, the amount of up-and-down displacement of the pivot point P at the front end portion d is small even when the support arm b is turned up and down motion, and hence this contributes little to an increase in the amount of lift L. In addition, in order to compensate for the increase in the size of the lower portion of the support arm b in the forward and rearward directions owing to the two guide members i, j', the front end portion d of the roof rail e must be extended in length to guide and support the front guide member i. As a result, the downward slope of the front end portion d is enlarged in proportion to the extension in length, and hence there is very little difference between this example of the prior art and the first example described above. Furthermore, though the amount of up-and-down motion of the support arm b can be increased if the front end portion d of the roof rail e is given a large curvature, thereby increasing the amount of displacement mentioned above so that it will contribute more greatly to the amount of lift, the greater curvature leads to more frictional resistance acting upon the guide members i and j'. This makes it difficult to open and close the sunroof a smoothly.

SUMMARY OF THE INVENTION

Accordingly, a first object of the present invention is to provide a sunroof sliding mechanism with which a heavy sunroof can be lifted up and closed smoothly by a small driving force, wherein the sunroof can be shut tightly with certainty when it is closed.

A second object of the present invention is to provide a sunroof sliding mechanism with which the amount of lift of a sunroof can be increased without enlarging the amount of downward inclination of the front end of the roof rail.

A third object of the present invention is to provide a sunroof sliding mechanism with which smooth back-and-forth movement of a sunroof is made possible by solving a problem encountered in the structure for attaining the second object, in which the pivot point of the support arm on the bracket is offset from the center point between the two guide members, namely a problem in which frictional resistance is enlarged owing to an increase in the pressing contact force of the roof rail acting upon the two guide members.

According to the present invention, the first object is attained by providing a sunroof sliding mechanism comprising a support arm having an upper portion, which is attached to a sunroof, and a lower portion, a roof rail having a main portion extending linearly in a horizontal direction and one end portion curved downwardly, a guide member guided and supported by the roof rail and provided on the lower portion of the support arm, a link having a first end, which is connected to the guide member, and a second end, and a drive cable for moving the other end of the link linearly back and forth.

Thus, in accordance with the invention, the guide member and the drive cable are interconnected by the link. Accordingly, even when the guide member is guided in a direction different from a drive direction at a downwardly curving portion of the front end of the roof rail, the link tilts correspondingly so that the component of the driving force lying in the direction of the roof rail is capable of acting upon the guide member effectively. Therefore, even when the direction of the driving force and the direction of movement of the guide member differ, the occurrence of a large frictional resistance between the link and the roof rail, as develops in the prior art example of FIG. 18, can be avoided. This makes it possible to move the support arm back and forth smoothly along the roof rail.

As a result, the closing and lifting of the sunroof can be performed smoothly without enlarging the output of the driving force, and the sunroof can be shut with assurance when the opening in the roof of the vehicle is closed.

The second and third objects of the invention are attained by providing a sunroof sliding mechanism comprising a bracket attached to a sunroof, a support arm having an upper portion, which is pivotally supported on the bracket at a pivot point, and a lower portion, a roof rail having a main portion extending substantially linearly in the horizontal direction and one end portion curving downwardly, front and rear guide members capable of moving in the roof rail and provided on the lower portion of the support arm, and biasing means provided between the bracket and the support arm for biasing them away from each other, wherein the pivot point is offset from a center point between the front and rear guide members toward the one end of the roof rail.

According to the present invention which attains the second object, a line segment connecting the pivot point and the center point can be tilted beforehand in a direction in which the support arm reclines by offsetting the pivot point from the center point toward the downwardly curving end of the roof rail. When the support arm is turned up and down at the end of the roof rail, therefore, the up-and-down displacement of the pivot point can be enlarged. Accordingly, the amount by which the sunroof is lifted up can be enlarged even if the amount of downward incline of the rail roof end is the same as well as the amount of curvature of this end. Furthermore, as a result of the aforementioned offset, the position of the lower portion of the support arm in the direction of the roof rail can be shifted in a direction opposite that of the abovementioned end of the roof rail. This makes it possible to avoid extending the length of the roof rail end portion, as occurs in the second example of the prior art described earlier.

As a result, the amount of sunroof lift can be increased without enlarging the amount of downward curve at the front end of the roof rail.

According to the present invention which attains the third object, when the pivot point is offset from the center point toward the downwardly curving one end of the roof rail, a reaction force $W_1'$ acting upon a front guide member 42 of a roof rail 34 and a reaction force $W_2'$ acting upon a rear guide member of the roof rail are expressed by the following equations, where it is assumed that weight W of the sunroof 3 acts directly upon the pivot point P:

$$W_1' = \frac{a_1 + b_1}{b_1} W = W + W_2'$$

$$W_2' = \frac{a_1}{b_1} W$$

When $a_1 = b_1$, for example, $W_2'$ is equal to W. When $W_1'$ is larger than W and $a_1 = b_1$, $W_2'$ is equal to 2W. In a case where the pivot point P is situated above the center point W, as in the second example of the prior art, the reaction force that acts upon each guide member is W/2, and $W_1'$, $W_2'$ both become very large in comparison with W/2. As a result, merely offsetting the pivot point P from the center point P leads to a new problem. Specifically, since the pressing contact force of the sunroof acting upon each of the guide members becomes large in magnitude, the frictional force also increases and detracts from smooth back-and-forth movement of the support arm.

Figure 2:
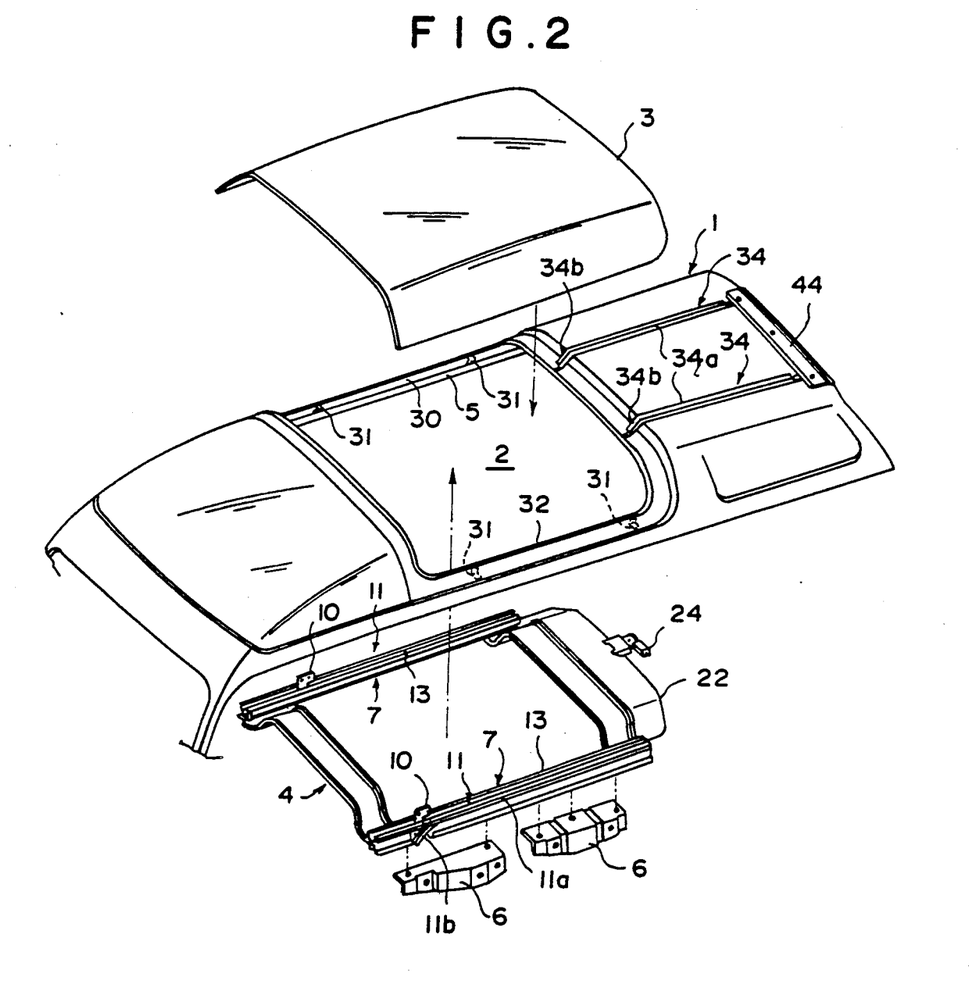
FIG. 2 is an exploded perspective view showing the overall construction.
Figures 8, 9:
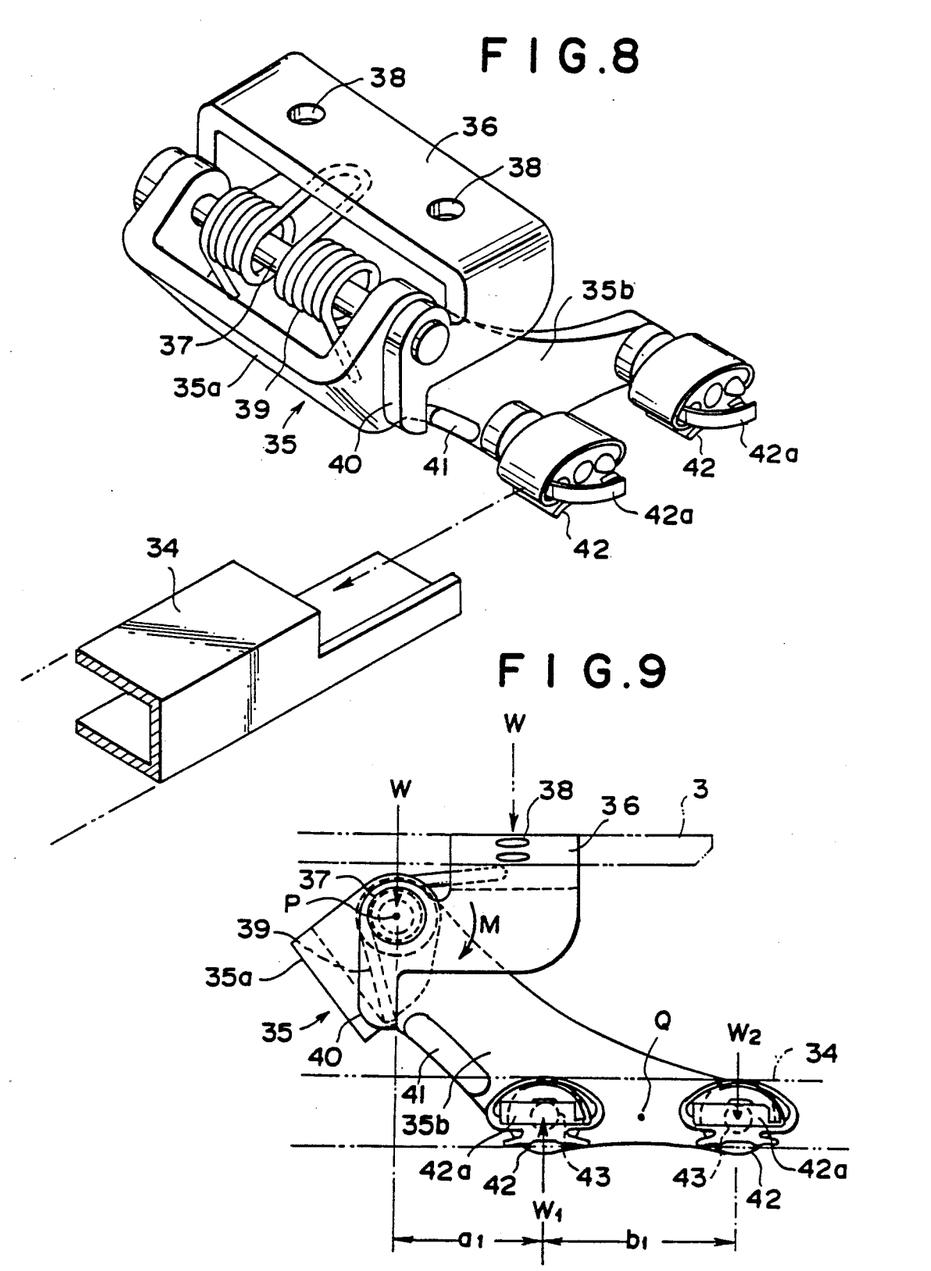
Figure 10:
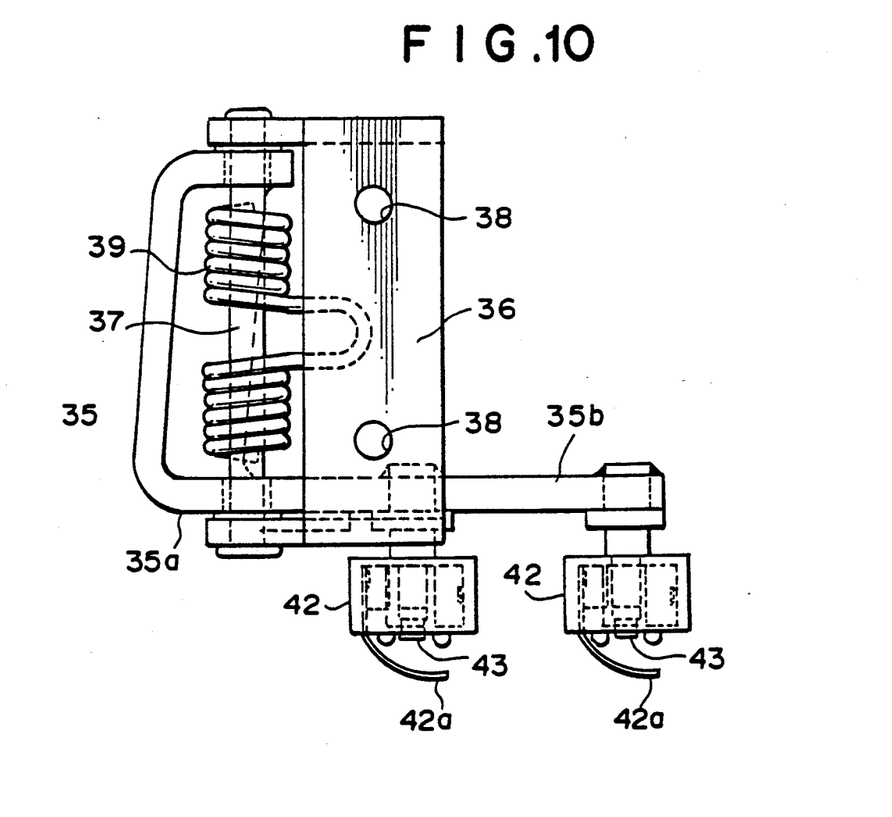
Figure 11:
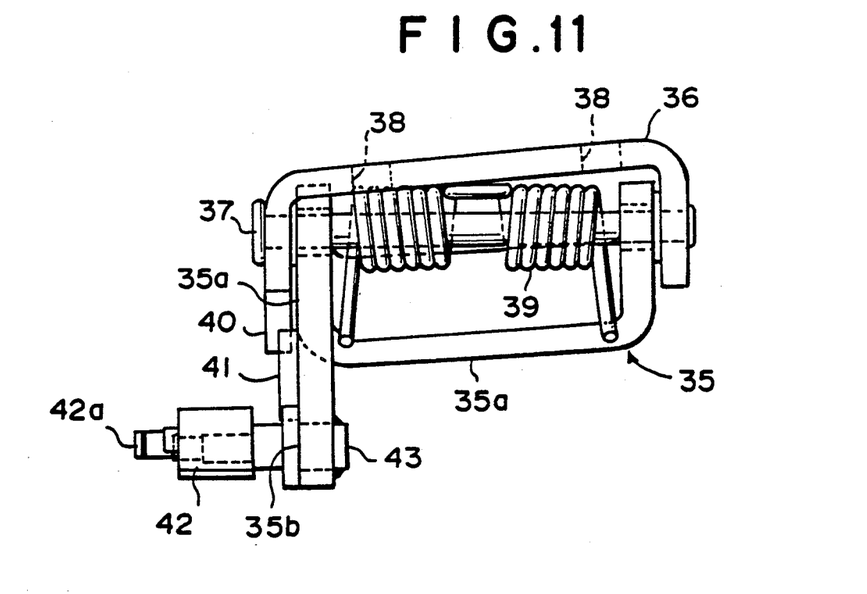

By contrast, in accordance with the invention, as illustrated in FIG. 9, biasing means 39 is interposed between a bracket 36 and a support arm 35, whereby the action of the weight W of the sunroof 3 upon the support arm 35 is converted into a combination of a downward force W acting upon the pivot point P and a moment M which attempts to turn the support arm 35 clockwise in FIG. 2. Owing to the force W and moment M, the front guide member 42 is pressed downwardly against the roof rail 34 and the rear guide member 42 is pressed upwardly against the roof rail 34 in a balanced manner. An upwardly directed reaction force $W_1$ produced by the roof rail 34 acts upon the front guide member 42, and a downwardly directed reaction force $W_2$ produced by the roof rail 34 acts upon the rear guide member 42.

Letting $a_1$ represent the longitudinal distance between pivot point P and the front guide member 42, and letting $b_1$ represent the longitudinal distance between the front and rear guide members 42, 42, the following equations are established:

$$W + W_2 = W_1 \tag{1}$$

$$W_1 \times a_1 = W_2(a_1 + b_1) + M \tag{2}$$

When $W_1$ and $W_2$ are obtained from Eqs. (1), (2), they are expressed as follows:

$$W_1 = \frac{a_1 + b_1}{b_1} W - \frac{M}{b_1} \tag{3}$$

$$W_2 = \frac{a_1}{b_1} W - \frac{M}{b_1} \tag{4}$$

In a case where the biasing means 39 is not provided and the weight W of the sunroof 3 acts directly upon the pivot point P, the reaction forces $W_1'$, $W_2'$, which act upon the guide members 42, 42 become $$\frac{a_1 + b_1}{b_1} W.$$

$$\frac{a_1}{b_1} W.$$

as set forth earlier. Therefore, in the case of the present invention, the reaction forces $W_1$, $W_2$ can be reduced by $M/b_1$ each in comparison with the foregoing, and the frictional resistance between the guide members 42 and the roof rail 34 can be reduced in comparison with the case in which the biasing means 39 is not provided. This makes possible smoother back-and-forth movement of the support arm 35. Furthermore, by enlarging the abovementioned moment M, excellent balance can be obtained between the reaction forces $W_1$, $W_2$ acting upon the front and rear guide members 42.

BRIEF DESCRIPTION OF THE DRAWINGS

FIG. 4 through 6 illustrate the state of connection between a guide member and a drive cable in the sliding mechanism of the embodiment, in which FIG. 4 is a front view, FIG. 5 a plan view and FIG. 6 a right-side view;

FIGS. 8 through 11 illustrate the principal portions of a rear sliding mechanism, in which FIG. 8 is a perspective view, FIG. 9 a front view, FIG. 10 a plan view and FIG. 11 a right-side view;

FIGS. 14 and 15 illustrate rear sliding mechanisms according to examples of the prior art, in which

DESCRIPTION OF THE PREFERRED EMBODIMENT

An embodiment of the present invention will now be described with reference to FIGS. 1 through 16.

Figure 3:
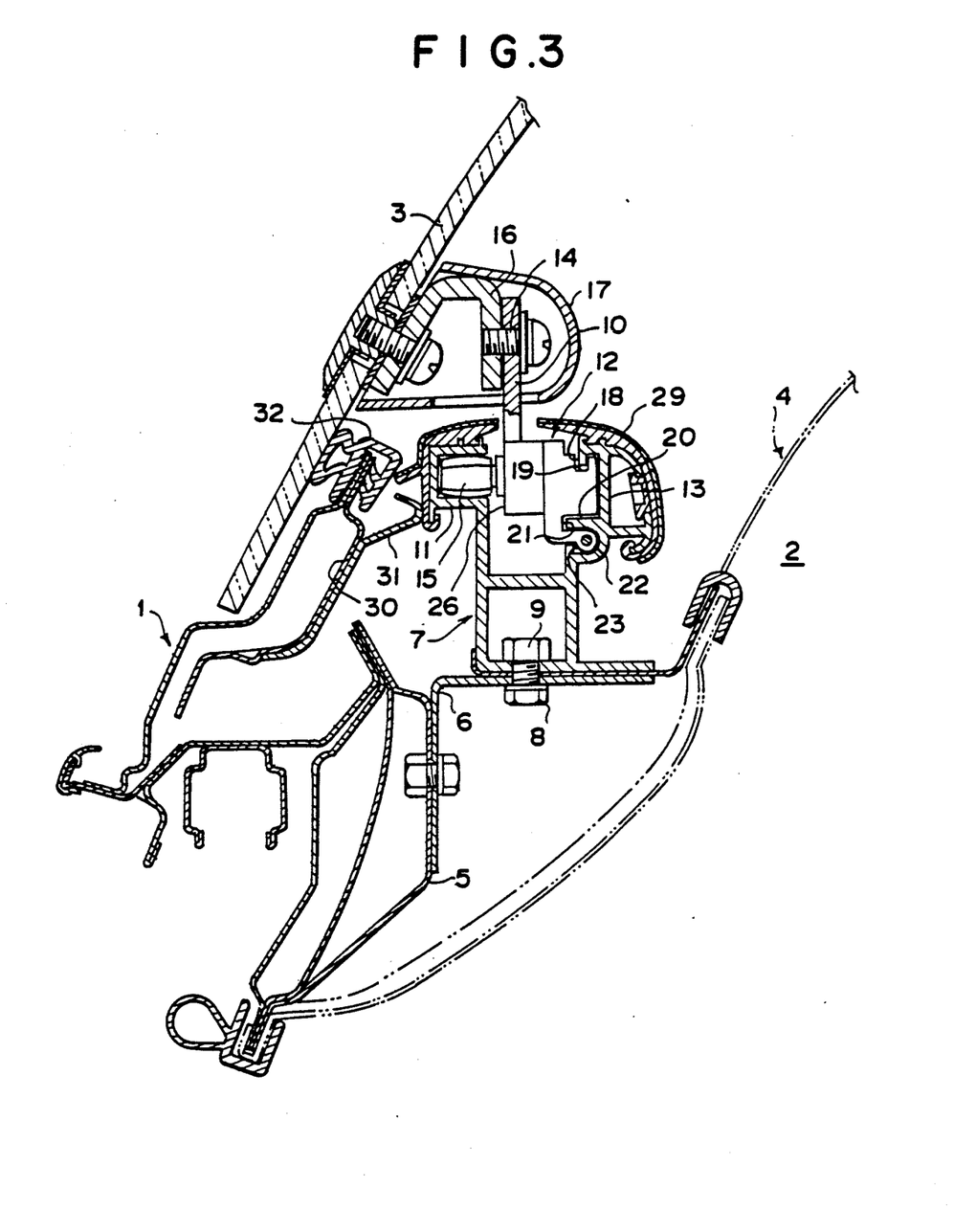
FIG. 3 is a sectional view taken along line III—III of FIG. 1.

As shown in FIG. 2, a roof 1 of a vehicle is provided with an opening 2 in a longitudinally central portion thereof, and the opening 2 is enlarged laterally of the vehicle so as to extend to both sides thereof. A sunroof 3 made of glass opens and closes the opening 2. A frame-shaped roof housing 4 is attached to the periphery of the opening 2. As shown in FIG. 3, both side portions of the roof housing 4 are accommodated on a roof side rail 5 via a retainer 6 having an inverted L-shaped cross section. A front sliding mechanism of the sunroof 3 is built in the roof housing 4 in advance and defines an assembly.

Rail portions 7 are disposed on both side edges of the roof housing 4. Each rail portion 7 is made of extrusion-molded aluminum and is fastened to the retainer 6 along with the side edge portion of the housing by a bolt 8 and nut 9. The bolt holes in the rail portion 7 and side edge portion are elongated in the lateral direction of the vehicle so that the roof side rail 5 can be positionally adjusted laterally of the vehicle when the housing is mounted.

Figure 1:
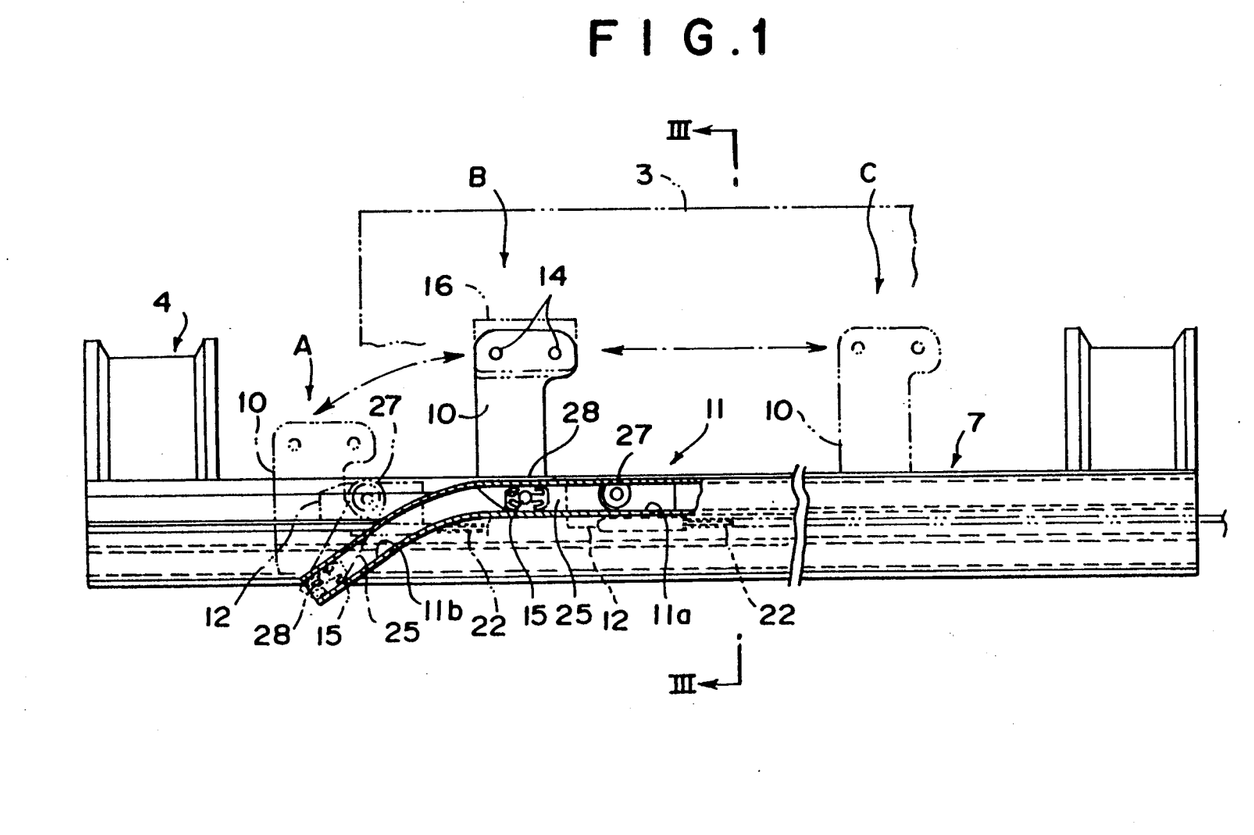
FIG. 1 is a side view, partially cut away, showing the principal portion of an embodiment of the present invention.

The rail portion 7 is obtained by integrally molding a main portion 11a of a front rail (roof rail) for guiding and supporting a front arm (support arm) 10 which supports a front portion of the sunroof 3, and a driving rail 13 for guiding and supporting a slider 12 which moves the front arm 10 back and forth. As shown in FIGS. 1 and 2, a downwardly curving front end portion (one end portion) 11b of the front rail 11 is formed by smoothly connecting a rail member, which has a generally U-shaped cross-section and is a member separate from the rail portion 7, to the main portion 11a, which is substantially linear.

Figures 4, 6:
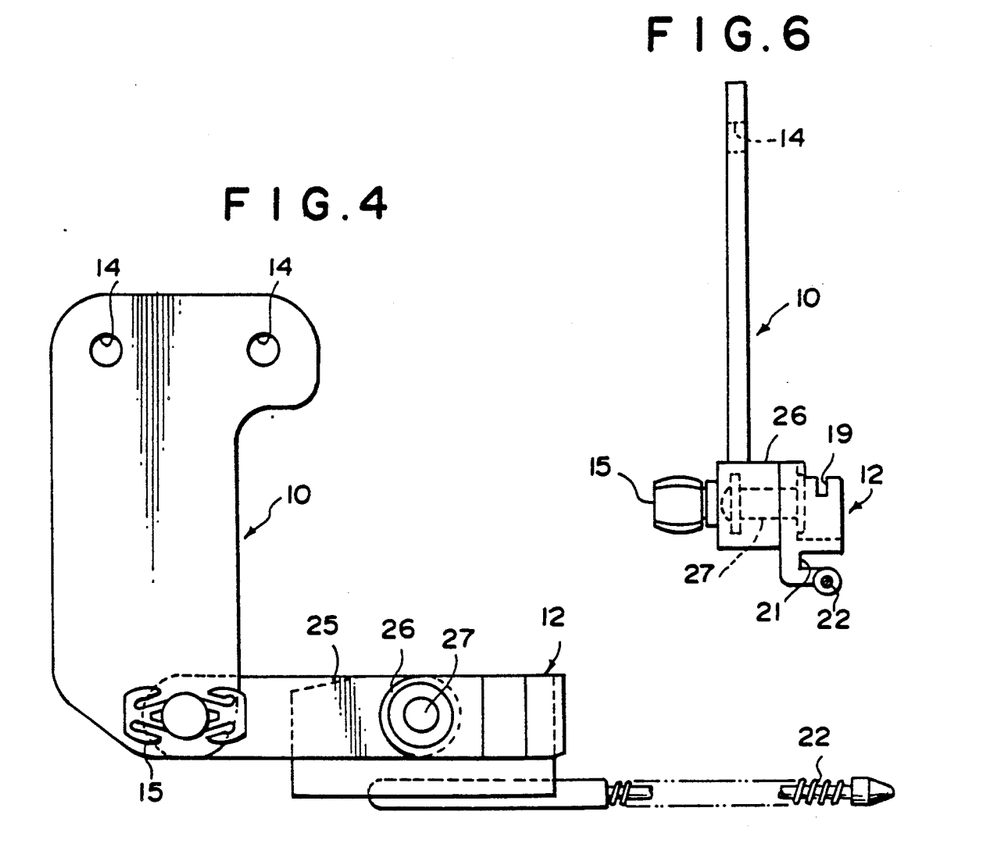
Figure 5:
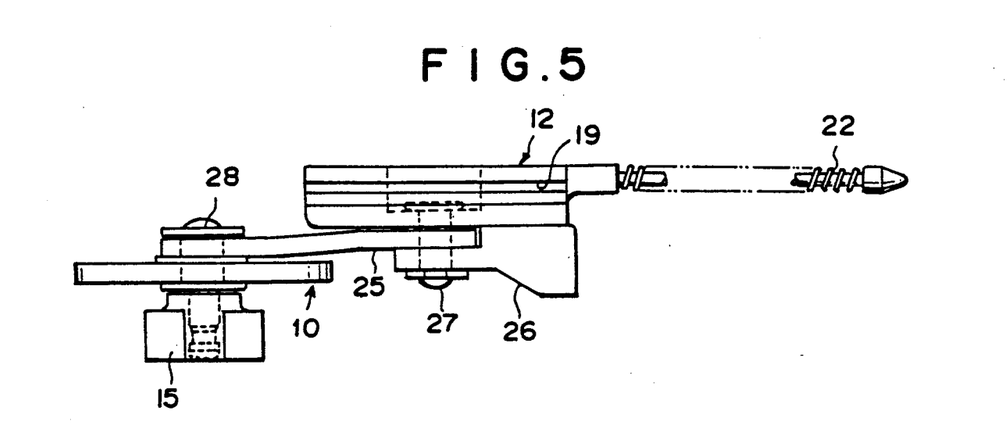

As shown in FIGS. 4 through 6, the front arm 10 has an elongated plate-shaped configuration and is equipped with a bolt holes 14 for attaching the sunroof 3 to the upper end portion thereof. A synthetic resin shoe 15 (guide member) capable of sliding in a first groove in a front wall 11 of the rail 7 is rotatably attached by a pin 28 to the lower end portion of the front arm 10 to that side face thereof which is outside the passenger compartment. As shown in FIG. 3, the front arm 10 is attached to the sunroof 3 via a curved holder 16 fastened at the bolt holes 14, and the location at which the holder 16 is attached is covered by a holder cover 17.

The slider 12 generally has the shape of a rectangular parallelepiped the upper surface of which is formed to have a groove 19 into which is fitted a guide piece 18 (see FIG. 3) depending from an upper edge portion of a second groove on the inner periphery of another wall 13 of the rail 7. A side face of the slider 12 on the inner side of the passenger compartment is formed to have a groove 21 into which is fitted a guide piece 20 projecting to the outside of the passenger compartment from a lower edge portion of the driving rail 13 on the inner periphery thereof. The front end portion of a toothed cable (drive cable) 22 capable of being pushed and pulled to move the slider 12 along the driving rail 13 is connected and fixed to the lower end portion of the slider 12. A hole 23 through which the toothed cable is passed is formed in the rail portion 7 in the part thereof underlying the driving rail 13. A source for driving the toothed cable 22 is a motor 24 (see FIG. 2) disposed on the rail portion 7 at the part thereof rearwardly of the opening 2.

The front arm 10 and the slider 12 are interconnected longitudinally by a link 25. The rear portion of the link 25 is pivotally supported on the slider 12 by a pin 27 in a state embraced by the slider 12 and an auxiliary member 26 formed integral with the side face of the slider on the outer side of the passenger compartment. The front end portion of the link 25 is pivotally supported on the lower end portion of the front arm 10 by a pin 28. The pin 28 serves also as a support for the shoe 15.

Furthermore, in FIG. 3, numeral 29 denotes a heat-shielding cover member which covers the upper surface of the rail portion 7, 30 a roof side panel, and 31 a positioning clamp attached to the roof side panel 30. The clamp 31 abuts against the rail portion 7 on the outer side of the passenger compartment when the housing is mounted, thereby positioning the roof housing 4 with respect to the roof side panel 30 in the lateral direction of the vehicle. Numeral 32 denotes weather stripping attached to edge of the opening 2.

The rear sliding mechanism of the sunroof 3 will now be described with reference to FIGS. 7 through 16.

Figure 7:
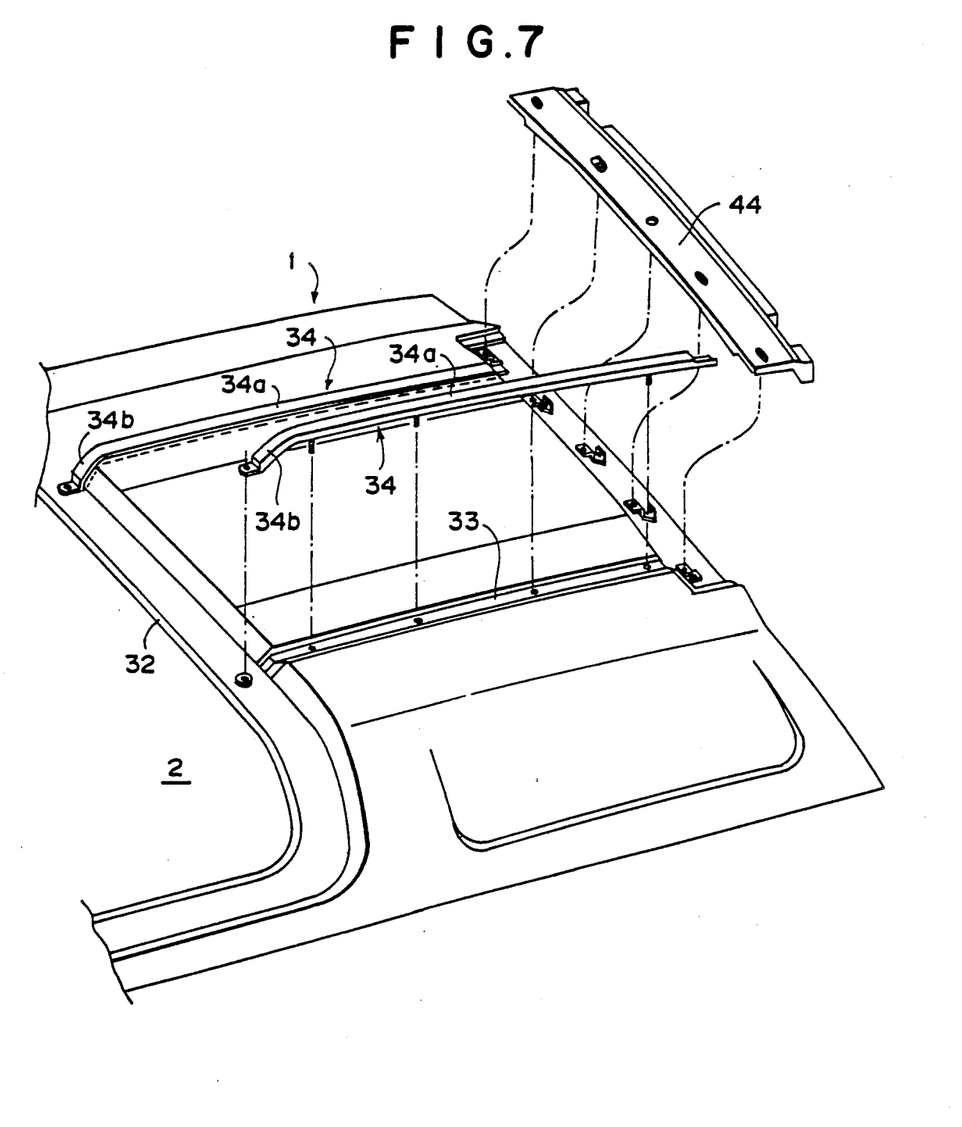
FIG. 7 is an exploded perspective view at a part rearwardly of the opening in a roof.

A longitudinally extending channel 33 is formed in the roof 1 rearward of the opening 2 at two locations spaced laterally of the vehicle. Rear rails 34 having a generally U-shaped cross section are attached to respective ones of the channels 33. Each rear rail 34 has a main portion 34a which is substantially linear, and a front end portion 34b which is curved downwardly. In FIG. 7, numeral 44 denotes a garnish for covering the rear end faces of the channels 33 and rear rails 34, and for smoothly connecting the surface of the roof 1 with the outer surface of a back door (not shown).

A rear arm 35 guided and supported by the rear rail 34 is pivotally supported by a pivot shaft 37 on a bracket 36 fastened to the rear portion of the sunroof 3. The bracket 36 is provided with fastening bolt holes 38. A torsion spring 39 is wound on pivot shaft 37 and serves to bias the bracket 36 and rear arm 35, both of which extend to the rear of the pivot shaft 37, away from each other. One side portion of the rear arm 35 is provided with a stopper 41 that comes into abutting contact with an abutting contact portion 40, which is provided on one side portion of the bracket 36, to prevent the bracket 6 and rear arm 35 from separating in excess of a predetermined turning angle. By virtue of the abutting contact portion 40 and stopper 41, the bracket 36 will not become more erect than necessary with respect to the rear arm 35, thereby preventing any impediment to the sunroof mounting operation.

The rear arm 35 has a pivot portion 35a for pivotally supporting the bracket 36, and an arm portion 35b. Shoes 42 which fit into the rear rail 34 are attached in side-by-side relation to the lower side of the arm portion 35b. Each shoe 42 is made of synthetic resin and is rotatably mounted by a pin 43. The side portion of the shoe 42 is formed to have a resilient projection 42a which comes into resilient contact with the side wall of the rear rail 34 to limit the position of the rear arm 35.

As illustrated in FIG. 9, the rear arm 35 is formed so that the portion about the pivot shaft 37 (pivot point P) is offset forwardly of a center point Q midway between the two shoes 42. The weight W of the sunroof 3 acts upon the bracket 36, as indicated by the phantom line arrow in FIG. 9. However, owing to the fact that the bracket 36 and rear arm 35 are pivotally connected and the torsion spring 39 is interposed between them, the action of the weight W upon the rear arm 35 is converted into a combination of a downward force W acting upon the pivot point P and a moment M which attempts to turn the rear arm 35 clockwise in FIG. 9. Owing to the force W and moment M, the front shoe 42 is pressed downwardly against the rear rail 34 and the rear shoe 42 is pressed upwardly against the rear rail 34 in a balanced manner. An upwardly directed reaction force $W_1$ produced by the rear rail 34 acts upon the front shoe 42, and a downwardly directed reaction force $W_2$ produced by the rear rail 34 acts upon the rear shoe 42.

Letting $a_1$ represent the longitudinal distance between pivot point P and the front shoe 42, and letting $b_1$ represent the longitudinal distance between the front and rear shoes 42, 42, the following equations are established:

$$W + W_2 = W_1 \quad (1)$$

$$W_1 \times A_1 = W_2(a_1 + b_1) + M \quad (2)$$

When $W_1$ and $W_2$ are obtained from Eqs. (1), (2), they are expressed as follows:

$$W_1 = \frac{a_1 + b_1}{b_1} W - \frac{M}{b_1} \quad (3)$$

$$W_2 = \frac{a_1}{b_1} W - \frac{M}{b_1} \quad (4)$$

In a case where the torsion spring 39 is not provided and the weight W of the sunroof 3 acts directly upon the pivot point P, the reaction forces $W_1'$, $W_2'$ which act upon the shoes 42, 42 become as follows:

$$W_1' = \frac{a_1 + b_1}{b_1} W$$

$$W_2' = \frac{a_1}{b_1} W$$

Therefore, in the case of this embodiment, the reaction forces $W_1$, $W_2$ can be reduced by $M/b_1$ each in comparison with the foregoing, and the frictional resistance between the shoes 42 and the rear rail 34 can be reduced in comparison with the case in which the torsion spring 39 is not provided. This makes possible smoother back-and-forth movement of the rear arm 35. Furthermore, by enlarging the abovementioned moment M, excellent balance can be obtained between the reaction forces $W_1$, $W_2$ acting upon the front and rear shoes 42.

The operation of the sunroof sliding mechanism constructed as set forth above will now be described.

Figure 16:
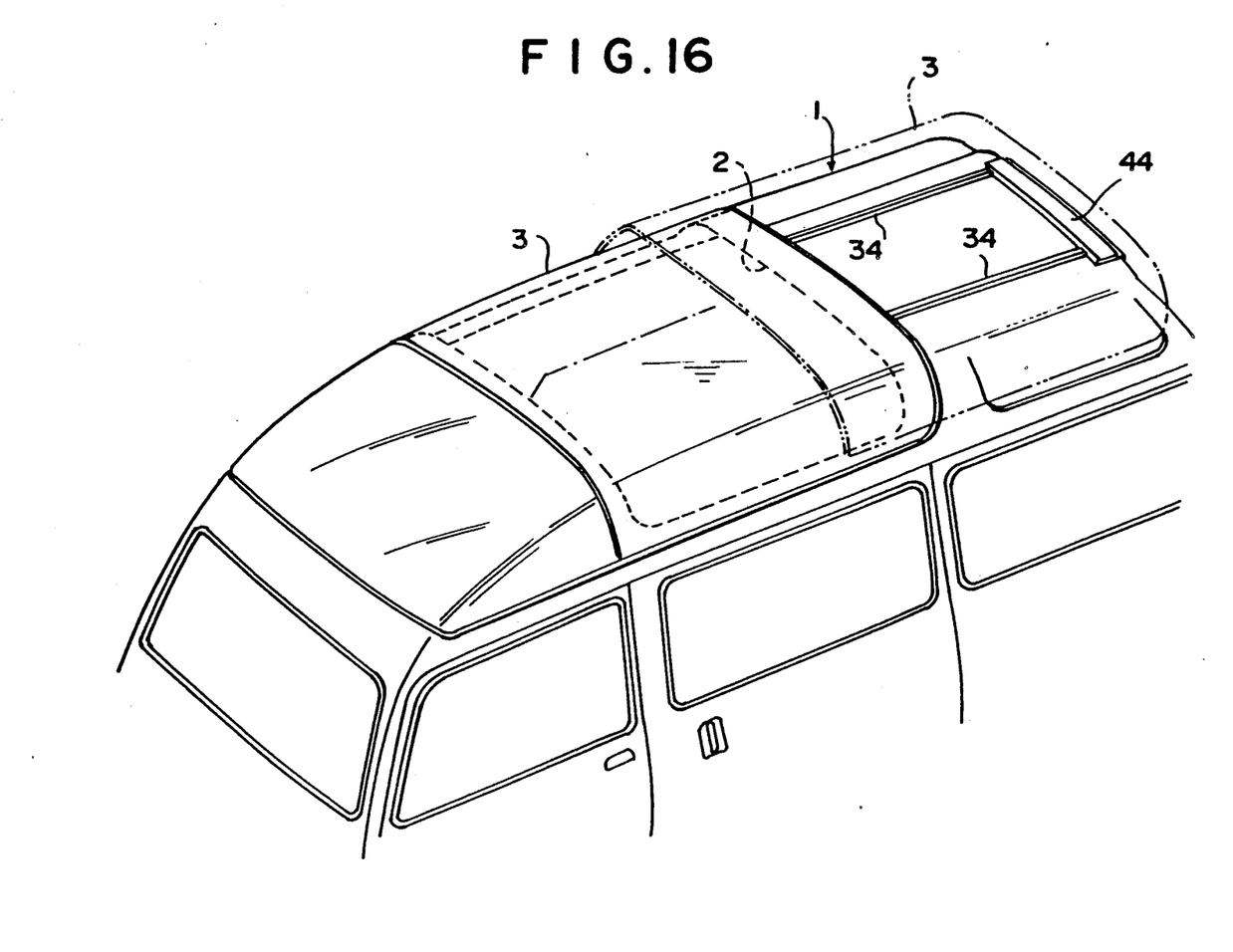
FIG. 16 is a perspective view showing the opening and closing operation of a sunroof.

When the opening 2 in the vehicle sunroof 1 is closed by the sunroof 3, as indicated by the solid lines in FIG. 16, the front arm 10 of the sunroof 3 is at the position indicated by A in FIG. 1. The shoe 15 of the front arm 10 is at the lowermost position of the front end 11b of front rail 11. This position is lower than that of the slider 12 and forward thereof. At this time the link 25 interconnecting the front arm 10 and the slider 12 is in a tilted attitude (indicated by the phantom line in FIG. 1).

When the toothed cable 22 is driven rearwardly by the motor 24, the slider 12 is moved rearwardly inside the driving rail 13 so that the front arm 10 is pulled to the rear via the link 25. As the shoe 15 is pulled upwardly along the incline of the front end 11b of front rail 11, the front arm 10 moves to position B indicated by the solid line in FIG. 1, whereby the sunroof 3 is capable of being lifted up while it is slid to the rear.

At this time the slider 12 is moved to the rear substantially linearly by the driving rail 13 and the path along which the toothed cable 22 travels also is maintained substantially linear, as a result of which the cable does not meet a large resistance to travel due to curvature of the cable 22 (see FIG. 17). Accordingly, the front portion of the sunroof 3 can be lifted up smoothly.

Figure 12:
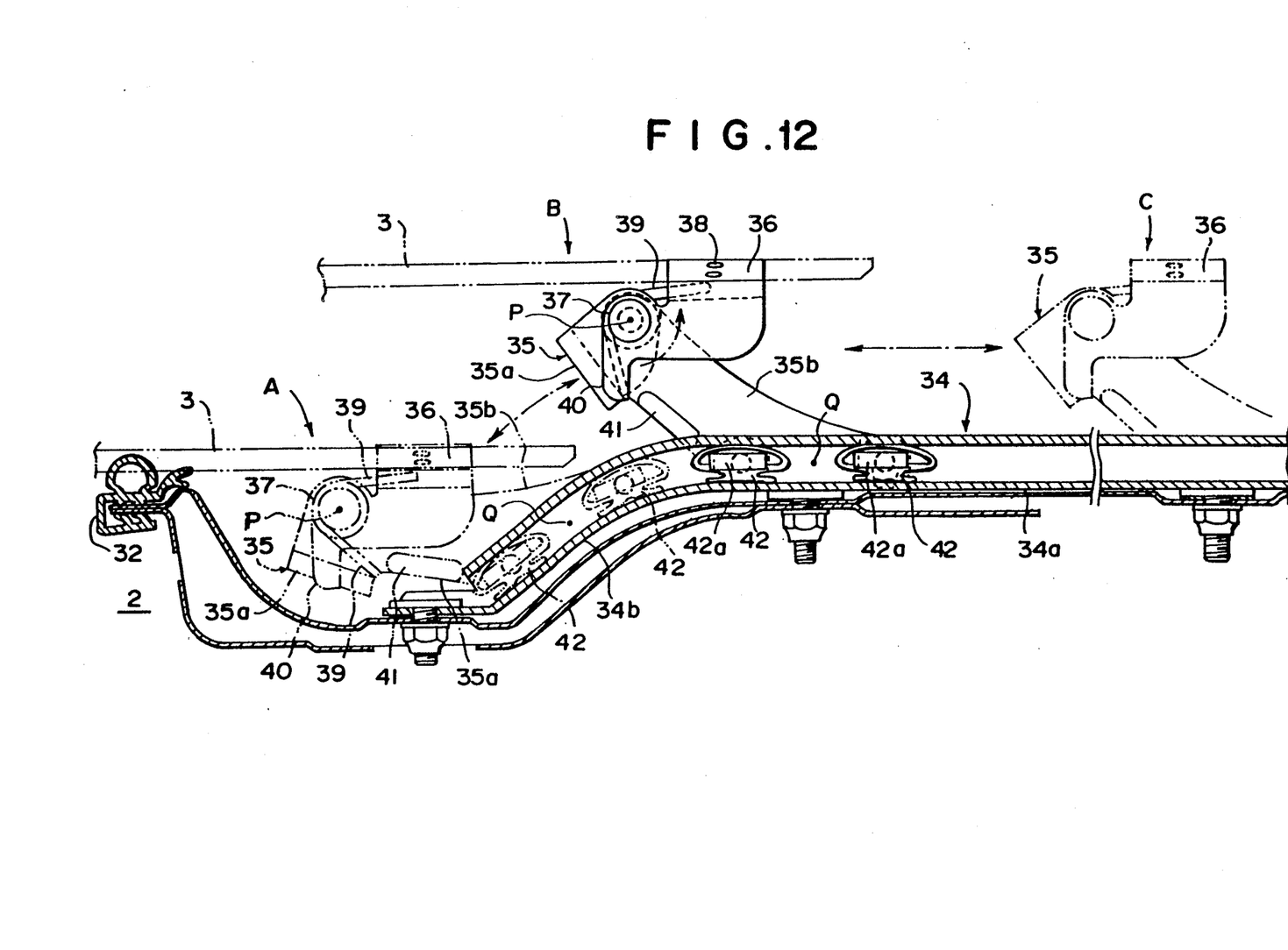
FIG. 12 is a side view of the same rear sliding mechanism.

On the other hand, at the rear portion of the sunroof 3, the rear arm 35 is at the position indicated by A in FIG. 12 when the opening 2 is in the closed state. At this time the shoes 42, 42 of the rear arm 35 are situated in the inclined front end portion 34b of the rear rail 34, and the rear arm 35 is in a forwardly reclined state.

When rear arm 35 is moved rearwardly from the foregoing position to position B indicated by the solid line in FIG. 12 in response to rearward sliding movement of the sunroof 3, the shoes 42, 42 of the rear arm 35 are lifted along the front end portion 34b of the rear rail 34, as a result of which the rear arm 35 is gradually erected from the reclined attitude while being moved upwardly, thereby lifting up the rear portion of the sunroof 3.

Figure 13:
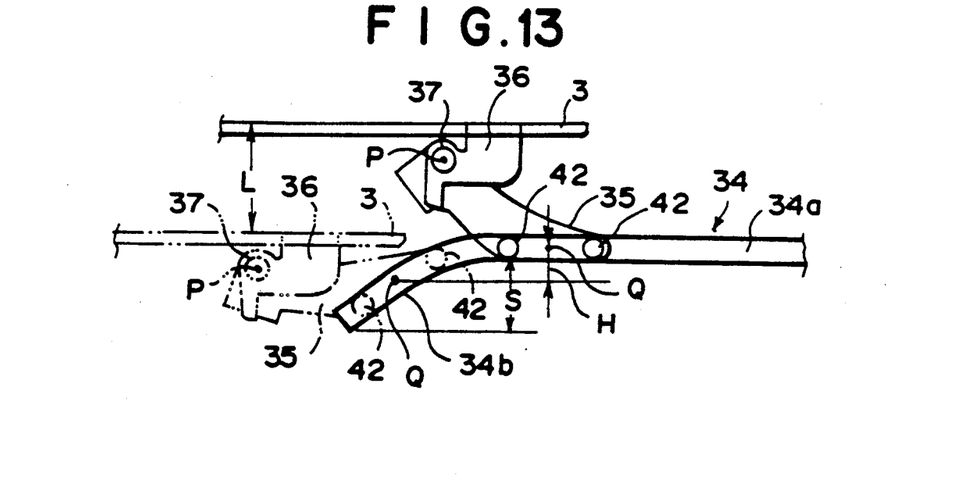
FIG. 13 is a view for describing the operation of the same rear sliding mechanism.

At this time, as shown in FIG. 13, the amount of lift L of the sunroof 3 becomes a value obtained by adding the amount of vertical displacement of the pivot point P, which results from the erection of the support arm 35, to the amount of arm movement H, namely the amount of vertical movement of the center point Q between the two shoes 42, 42. In the case where the amount of lift L is achieved with the fixed arm-type example of FIG. 14, the amount of arm movement Hk and the amount of lift L are equal, so that the amount of downward incline Sk of the front end d of the rear rail is large in comparison with the amount of downward incline S of this embodiment. In the case where the amount of lift L is achieved with the inverted T-shaped arm-type example of FIG. 15, the amount of arm movement Ht is somewhat smaller in comparison with the fixed arm-type arrangement (Ht<Hk) but larger than that of this embodiment (H<Ht), and the amount of downward incline St of the front end d of the rear rail is still larger to the extent that the abovementioned offset lacks. The reason for the large value of St in the inverted T-type arm arrangement is as follows: Since the position of the front guide member i when the rear arm is in the reclined attitude, indicated by the phantom line, is lower than that of the front shoe 42 of this embodiment, the front end d of the rear rail must be elongated correspondingly. Moreover, since the amount of inclination of the front end of the line segment connecting the center point Q and the pivot point P is small, the amount of displacement of the pivot point P is smaller than that of this embodiment for the same turning angle of the support arm.

Thus, in accordance with the present embodiment, the amount of lift can be increased, over that of the fixed arm-type arrangement, by the amount of vertical displacement of the pivot shaft 37, and the amount of downward incline of the front end 34b of the rear rail can be reduced, over that of the inverted T-shaped arm arrangement, by the amount of offset. As a result, the ceiling of the passenger compartment can be set higher, thus making it possible to enlarge the space inside the passenger compartment.

After the front and rear portions of the sunroof 3 are thus lifted, the sunroof 3 is slid rearwardly to the position indicated by the phantom line in FIG. 16 in conformity with the rearward movement of the slider 12 at the front portion. The opening 2 in the roof can thus be opened.

The operation for closing the opening 2 will now be described.

When the toothed cable 22 is reversed and driven forwardly by the motor 24, the front arm 10 is moved forwardly along the main portion 11a of the front rail 11, thereby sliding the sunroof 3 in the forward direction. The rear arm 35 follows up this movement by traveling along the main portion 34a of the rear rail 34.

When the shoe 15 of the front arm 10 moves into the front end portion 11a of the front rail 11, the front arm 10 is pushed forwardly by the slider 12 via the link 25, as a result of which the front arm 10 is pushed downward owning to a force component directly obliquely downward along the front end portion 11a and acting upon the shoe 15. Accordingly, the sunroof 3 is brought into pressured contact with the weather stripping 32 by the abovementioned force component, thus making it possible to reliably shut and seal the opening 2 in the roof of the automobile.

Meanwhile, when the rear arm 35 is moved along the main portion 34a of the rear rail 34 and enters the front end portion 34b at the rear of the sunroof 3, the rear arm 35 moves downwardly and is reclined forwardly by the shoes 42, 42, thereby lowering the pivot shaft 37. This makes it possible to reliably shut and seal the rear portion of the sunroof 3.

It should be noted that the present invention can be realized in various other modes different from that of the foregoing embodiment.

For example, though the guide members are realized by shoes in the foregoing embodiment, rollers can be employed instead. Furthermore, the height of the drive cable relative to the main portion of the roof rail is not limited to that shown in the foregoing embodiment, and a suitable arrangement can be adopted as required.

Owing to the above-described construction and effects of the present invention, a heavy sunroof can be lifted up and closed smoothly by a small driving force, and the sunroof can be shut tightly with assurance when closed.

Furthermore, by offsetting the pivot point to the front side of the center point, the amount of lift can be increased without enlarging the amount of downward inclination of the front end of the roof rail. This makes it possible to provide more space in the passenger compartment.

In addition, the increase in frictional resistance between the guide members and roof rail due to the abovementioned offset can be reduced, thereby allowing the support arm to be moved back and forth more smoothly.

As many apparently widely different embodiments of the present invention can be made without departing from the spirit and scope thereof, it is to be understood that the invention is not limited to the specific embodiments thereof except as defined in the appended claims.

What is claimed is:

1. A sunroof sliding mechanism comprising:
    a roof housing (4) disposed around an opening (2) formed in a roof (1) of an automotive vehicle;
    a rail portion (7) situated on each side of the opening and fixed to said roof housing, said rail portion including one wall having a first groove and another wall having a second groove;
    a sunroof (3) for opening and closing the opening;
    a front arm (10) having a distal end fixed to a front portion of said sunroof, a lower end, and a freely rotatable shoe (15) connected to said lower end on a pivot axis;
    a slider (12);
    a link (25) having one end pivotally connected to said slider and an opposite end pivotally connected to said front arm on said pivot axis; and
    a drive cable (22) connected to said slider and coupled to a source of driving force;

said shoe being free to move along the first groove in said one wall of said rail portion and said slider being free to move along the second groove in said other wall of said rail portion;

said rail portion comprising a downwardly curved front end portion (11b) and a horizontal main portion (11a).

2. A sunroof sliding mechanism comprising:
a roof housing (4) disposed around an opening (2) formed in a roof (1) of an automotive vehicle;
a rail portion (7) situated on each side of the opening and fixed to said roof housing, said rail portion including one wall having a first groove and another wall having a second groove;
a sunroof (3) for opening and closing the opening;
a front arm (10) having a distal end fixed to a front portion of said sunroof, a lower end, and a freely rotatable shoe (15) provided on the lower end;
a slider (12) connected to said front arm by a link (25); and
a drive cable (22) connected to said slider and coupled to a source of driving force;
said shoe being free to move along the first groove in said one wall of said rail portion and said slider being free to move along the second groove in said other wall of said rail portion;
said rail portion comprising a downwardly curved front end portion (11b) and a horizontal main portion (11a);
said rail portion having a generally U-shaped cross section, a pair of guide pieces (18, 20) being projectively provided in the second groove, and said slider having channels (19, 21) to receive said pair of guide pieces.

3. The sunroof sliding mechanism according to claim 2, wherein said rail portion includes a front rail (1) for receiving said shoe and a driving rail (13) opposite from said front rail for supporting said slider, said shoe being positioned forwardly and laterally of said slider.

* * * * *

UNITED STATES PATENT AND TRADEMARK OFFICE
CERTIFICATE OF CORRECTION

PATENT NO. : 5,114,208

DATED : May 19, 1992

INVENTOR(S) : Nobuyuki IKEDA et al.

It is certified that error appears in the above-identified patent and that said Letters Patent is hereby corrected as shown below:

Claim 3, column 12, line 16, change "(1)" to --(11)--.

Signed and Sealed this

Twentieth Day of July, 1993

Attest:

MICHAEL K. KIRK

Attesting Officer

Acting Commissioner of Patents and Trademarks